US011512552B2

(12) United States Patent
Fripp et al.

(10) Patent No.: US 11,512,552 B2
(45) Date of Patent: Nov. 29, 2022

(54) SEALING APPARATUS WITH SWELLABLE METAL

(71) Applicant: HALLIBURTON ENERGY SERVICES, INC., Houston, TX (US)

(72) Inventors: Michael Linley Fripp, Carrollton, TX (US); Geir Gjelstad, Dallas, TX (US); Zachary William Walton, Carrollton, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 126 days.

(21) Appl. No.: 16/958,778

(22) PCT Filed: Jan. 29, 2018

(86) PCT No.: PCT/US2018/015755
§ 371 (c)(1),
(2) Date: Jun. 29, 2020

(87) PCT Pub. No.: WO2019/147285
PCT Pub. Date: Aug. 1, 2019

(65) Prior Publication Data
US 2020/0325749 A1    Oct. 15, 2020

(51) Int. Cl.
*F16J 15/06*    (2006.01)
*E21B 33/12*    (2006.01)
(Continued)

(52) U.S. Cl.
CPC .......... *E21B 33/1208* (2013.01); *C09K 8/516* (2013.01); *E21B 33/128* (2013.01);
(Continued)

(58) Field of Classification Search
CPC .. E21B 33/1208; E21B 2200/01; F16J 15/068
See application file for complete search history.

(56) References Cited

U.S. PATENT DOCUMENTS

| 6,359,282 | B1 * | 3/2002 | Sekela ............. G01T 1/20 250/363.02 |
| 7,040,404 | B2 | 5/2006 | Brothers et al. |

(Continued)

FOREIGN PATENT DOCUMENTS

| RO | 131055 A2 | 4/2016 |
| WO | 2014210283 A1 | 12/2014 |

OTHER PUBLICATIONS

Written Opinion; Singapore application No. 11202005195R, dated Aug. 30, 2021, 6 pages.
(Continued)

*Primary Examiner* — Catherine Loikith
(74) *Attorney, Agent, or Firm* — Novak Druce Carroll LLP

(57) ABSTRACT

A sealing apparatus includes a swellable metal. The swellable metal, when exposed to a fluid, is transitionable from an initial configuration having an initial volume to an expanded configuration having an increased volume. The swellable metal, upon transitioning to the expanded configuration in an annulus of a fluid channel, forms a seal against a surface of the fluid channel such that fluid communication across the swellable metal in the annulus is at least partially restricted.

15 Claims, 3 Drawing Sheets

(51) Int. Cl.
*C09K 8/516* (2006.01)
*E21B 33/128* (2006.01)
*F16J 15/3284* (2016.01)

(52) U.S. Cl.
CPC ......... *F16J 15/068* (2013.01); *E21B 2200/01* (2020.05); *F16J 15/3284* (2013.01)

(56) References Cited

U.S. PATENT DOCUMENTS

| | | |
|---|---|---|
| 7,059,415 B2 | 6/2006 | Bosma et al. |
| 7,578,347 B2 | 8/2009 | Bosma et al. |
| 8,127,859 B2 | 3/2012 | Allison et al. |
| 8,448,713 B2 * | 5/2013 | Munshi ................ E21B 33/127 166/243 |
| 9,702,217 B2 | 7/2017 | Dolog et al. |
| 2003/0150614 A1 | 8/2003 | Brown et al. |
| 2010/0243276 A1 | 9/2010 | Chauffe et al. |
| 2010/0270031 A1 | 10/2010 | Patel |
| 2011/0030954 A1 | 2/2011 | Allison et al. |
| 2012/0175134 A1 | 7/2012 | Robisson et al. |
| 2012/0292013 A1 | 11/2012 | Munshi et al. |
| 2014/0210283 A1 | 7/2014 | Kem et al. |
| 2016/0376869 A1 | 12/2016 | Rochen et al. |
| 2017/0159401 A1 | 6/2017 | Saltel et al. |

OTHER PUBLICATIONS

Romania Office Action for application No. a 2020 00364, dated Oct. 27, 2021, 24 pages (both English translation and original).
Canadian Office Action for application No. 3,085,547, dated Dec. 8, 2021, 4 pages.
International Search Report and Written Opinion; PCT Application No. PCT/US2018/015755; dated Oct. 30, 2018.

* cited by examiner

SEALING APPARATUS WITH SWELLABLE METAL

CROSS-REFERENCE TO RELATED APPLICATIONS

This application is a national stage entry of PCT/US2018/015755 filed Jan. 29, 2018, said application is expressly incorporated herein by reference in its entirety.

FIELD

The present disclosure relates generally to a sealing apparatus. In particular, the present disclosure relates to a sealing apparatus with swellable metal that transitions to an expanded configuration with a larger volume.

BACKGROUND

The production and transport of hydrocarbons requires the use of various tubulars above and below ground. After drilling a wellbore, production tubing may be placed in the wellbore and hydrocarbons drawn from surrounding formations. Once on the surface, these hydrocarbons are often transmitted to processing plants via tubular pipelines. During such processes, fluid flow inside or around the tubulars may need to be controlled or prevented. Accordingly seals, in the form of packers for instance, may be provided to isolate sections of the fluid channel along the various tubulars and wellbores. For example, in a wellbore, the annulus between a formation and production tubing may require a seal to isolate sections within the wellbore.

BRIEF DESCRIPTION OF THE DRAWINGS

Implementations of the present technology will now be described, by way of example only, with reference to the attached figures, wherein.

DETAILED DESCRIPTION

Figure 1:
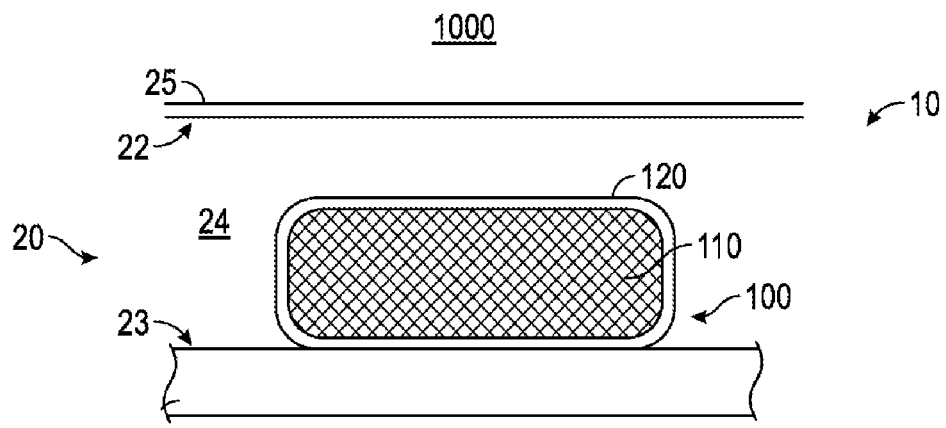
FIG. 1 is a schematic diagram of an exemplary environment for a sealing apparatus with a swellable metal according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein are systems and methods for a sealing apparatus having a swellable metal. The swellable metal, when exposed to a fluid such as a brine, or any aqueous fluid, expands in size thereby transitioning from a first configuration having an initial or first size (i.e., volume) to an expanded configuration. During this expansion the volume of the swellable metal increases to larger than the initial or first size in the first configuration. Due to this larger size, the swellable metal acts to inhibit and block fluid from flowing past itself. Moreover, when expanded against a surface the swellable metal may form a seal. For instance, the swellable metal, upon transitioning to the expanded configuration in an annulus of a fluid channel, may form a seal against a surface of the fluid channel such that fluid flow across the swellable metal in the annulus is at least partially restricted, and in at least one example, prevented.

The swellable metal may be formed of any hydrolyzable metal material, that when hydrolyzing expands in volume, thereby increasing in size. Accordingly, when contacting an aqueous fluid, the swellable metal hydrolyzes and expands in volume.

The sealing apparatus can also include an encapsulant which can enclose at least a portion of the swellable metal. The encapsulant can permit fluid to flow through the encapsulant to the swellable metal. Also, the encapsulant can protect the swellable metal from acid, as acid can prevent the swellable metal to form a solid after hydrolyzing. Further, the encapsulant can enhance the sealing of the sealing apparatus against the surfaces of the fluid channel.

FIG. 1 illustrates a schematic diagram of an exemplary system 10 with portion of a fluid channel 20. The fluid channel 20 is illustrated as within a wellbore annulus 24 which is formed between a casing surface 22 of casing 25 and a production tubing surface 23 of production tubing 25. Accordingly, fluid may be contained and flow within the casing surface 22 and the production tubing surface 23 (referred to herein as "surfaces 22, 23") of fluid channel 20. Although shown formed from an annulus, the fluid channel 20 may alternatively be any pipeline, drill string, or other portions of a wellbore or any channel through which fluid flows.

The surfaces 22, 23 of the fluid channel 20 can form a cross-sectional shape that may be substantially circular, ovoid, rectangular, or any other suitable shape. The surfaces 22, 23 of the fluid channel 20 may be made of, for example, the same material as the casing 25 or production tubing 25, which is in this case metal, however alternatively, the surfaces of the fluid channel 20 may be formation rock, or plastic, or other metal or metal alloy. The surfaces 22, 23 of the fluid channel 20 can be the same material on all sides. In other examples, the surfaces 22, 23 of the fluid channel 20 can have different materials or compositions in different areas. The portion of the fluid channel 102 may have any orientation or extend only in one direction or multiple directions, for example vertical or at an angle, along any axis, and may be but is not required to be horizontal as schematically depicted in FIG. 1. The fluid can be one fluid or more than one fluid. The fluid can include, for example, water or oil. The fluid can also substantially fill the entire fluid channel 20. In other examples, the fluid can partially fill the fluid channel 20. The fluid can be static or flowing.

As shown in FIG. 1, a sealing apparatus 100 is provided in the annulus 24 of the fluid channel 20. The sealing apparatus 100 is illustrated in FIG. 1 to be abutting one surface of the fluid channel 20, and in this case the production tubing surface 23. In at least one example, the sealing apparatus 100 can be suspended in the annulus 24 of the fluid channel 20. In yet other examples, the sealing apparatus 100 can be coupled with a device to position the sealing apparatus 100 in the fluid channel 20. The sealing apparatus 100, as illustrated in FIG. 1, has a cross-section that is substantially rectangular. In other examples, the sealing apparatus 100 can have a cross-section that is substantially circular, ovoid, triangular, quadrilateral, polygonal, or any suitable shape.

The sealing apparatus 100 includes a swellable metal 110. The swellable metal 110 is a metal which hydrolyzes and is operable to transition to an expanded configuration 2000 (see FIG. 2) having an increased volume when exposed to a fluid. The fluid may be any aqueous fluid, and in particular salt containing aqueous fluids such as brine. For example, the fluid can be high salinity brine, for example a NaCl brine or a KCl brine where the salt content is greater than 15%. In other examples, the fluid can be any suitable fluid with water which hydrolyzes the swellable metal 110. In at least one example, the swellable metal 110 does not swell in oil or in oil based mud. The swellable metal 110 reacts with water in a fluid to form a metal hydroxide and/or a metal oxide. The volume of the swellable metal 110 increases during the reaction, as the products of the metal hydration reaction have a greater volume than the reactants. As a result, the metal hydroxide reactant of the swellable metal 110 occupies more space than the base metal. Upon transitioning to the expanded configuration 2000, the volume of the swellable metal 110 can increase, for example, by greater than 30% when uninhibited by the fluid channel 20. However, the surfaces 22 of the fluid channel 20 can impede further expansion of the swellable metal 110.

The swellable metal 110 includes at least one of an alkaline earth metal, a transition metal, and a post-transition metal. For example, the swellable metal 110 can include at least one of magnesium, aluminum, and calcium that can hydrolyze when reacted with water in a fluid to form a metal hydroxide. The metal hydroxide can be substantially insoluble in water. The swellable metal 110 can, in at least one example, be one metal. In other examples, the swellable metal 110 can be an alloy to increase the reactivity or to control the formation of hydroxides/oxides where the alloying element can include at least one of aluminum, zinc, manganese, zirconium, yttrium, neodymium, gadolinium, silver, calcium, tin, rhenium, and any other suitable elements. The alloy swellable metal 110 can be further alloyed with a dopant that promotes corrosion. For example, the dopant can include at least one of nickel, iron, copper, cobalt, carbon, tungsten, tin, gallium, bismuth, or any other suitable dopant that promotes corrosion. Additional ions can also be added to the reaction, for example, silicate, sulfate, aluminate, phosphate, or any other suitable ions. The swellable metal 110 can be constructed in a solid solution process where the elements are combined with molten metal. In other examples, the swellable metal 110 can be constructed with a powder metallurgy process.

The reaction of a swellable metal 110 with a fluid is shown below, where M is a metal, O is oxygen, H is hydrogen, and a, b and c are numbers which can be the same or different:

$$M + aH_xO \rightarrow M(OH)_b + cH_2$$

For example, if the metal is magnesium, the hydration reaction is:

$$Mg + 2H_2O \rightarrow Mg(OH)_2 + H_2.$$

$Mg(OH)_2$ takes 85% more volume than the original magnesium.

In other example, if the metal is aluminum, the hydration reaction is:

$$Al + 3H_2O \rightarrow Al(OH)_3 + 3/2 H_2$$

$Al(OH)_2$ takes 160% more volume than the original aluminum.

In yet another example, if the metal is calcium, the hydration reaction is:

$$Ca + H_2O \rightarrow Ca(OH)_2$$

$Ca(OH)_2$ takes 32% more volume than the original calcium.

The term "swellable" when used to describe the metal is meant to convey that the volume of the hydrolytically reacted byproducts has a greater volume than the original metal. For example, the swellable metal reacts with water to create micron-sized particles and then the particles lock together to create a seal. In some examples, the volume of the space proximate the swellable metal is less than the expansion volume of the swellable metal such that the swellable metal, when transitioning to the expanded configuration, can abut the surface of the fluid channel to provide a seal. For example, the free volume proximate the swellable metal can be approximately half of the expansion volume. For example, in the case of magnesium as the swellable metal, the free volume proximate the magnesium can be less than 85% of the volume of the original magnesium. The free volume can be expressed as the cross sectional area of the metal and the cross sectional area of the space that needs to be sealed.

The hydroxide can be further dehydrated due to the swelling pressure. If the metal hydroxide resists movement of the additional hydroxide formation, then elevated pressures can be created. The metal hydroxide within the zone can dehydrate under elevated pressure. The result is that the metal hydroxide can be dehydrated further into a metal oxide. For example, the dehydration reaction of $Mg(OH)_2$ can form $MgO + H_2O$. Similarly, $Ca(OH)_2$ can become $CaO + H_2O$, and $Al(OH)_3$ can be dehydrated to become $AlOOH$ or $Al_2O_3$.

In other examples, the swellable metal 110 in the initial state 1000 can be a metal oxide. For example, calcium oxide (CaO) with water will produce calcium hydroxide in an energetic reaction. Due to the higher density of calcium oxide, the reaction will provide a 260% volumetric expansion where converting 1 mole of CaO expands from 9.5 cc to 34.4 cc of volume.

Figure 3:
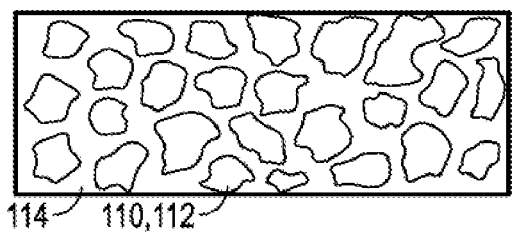
FIG. 3 is a schematic diagram of a of an exemplary swellable metal carried in a binder.

In at least one example, the swellable metal 110 can be a solid piece of metal. The solid piece of swellable metal 110 can be a ring, a tube, a cylinder, a wrap, or any other shape. In other examples, the swellable metal 110 can resemble a mafic material and be porous. In yet other examples, the swellable metal can be in particulate 112 form, as illustrated in FIG. 3. The particles 112 of the swellable metal 110 can be carried in a binder 114. The binder 114 can be a degradable binder. With a degradable binder, the binder 114 degrades and allows the active material of the swellable metal 110 to react with the fluid. In other examples, the binder 114 does not degrade. In yet other examples, the binder 114 is a swellable elastomer, such as an oil-swellable rubber, a water-swellable rubber, or a hybrid swellable rubber. The binder 114 can also be porous. Any other suitable binders 114 to carry the particles 112 of the swellable metal 110 can be used. The particles 112 of the swellable metal 110 can be evenly distributed in the binder 114. In other examples, the particles 112 of the swellable metal 110 can be distributed to provide for a desired range of expansion and solidification in desired sections of the sealing apparatus 100.

Figure 2:
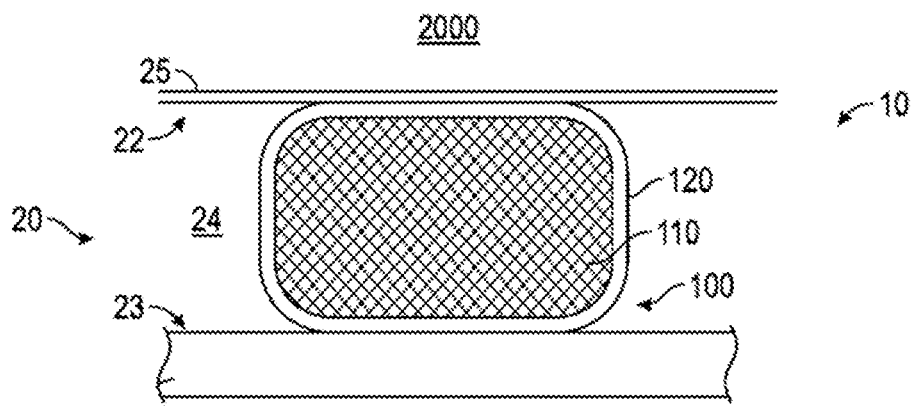
FIG. 2 is a schematic diagram of the exemplary environment of FIG. 1, with the swellable metal in an expanded configuration.

The sealing apparatus 100 can also include an encapsulant 120. While FIGS. 1 and 2 illustrate an encapsulant 120, in at least one example, the sealing apparatus 100 may not include an encapsulant 120.

The encapsulant 120 encloses at least a portion of the swellable metal 110. In at least one example, the encapsulant 120 can enclose only one side of the swellable metal 110. In other examples, the encapsulant 120 can enclose substantially the entire swellable metal 110. The encapsulant 120 is operable to permit the fluid to flow through the encapsulant 120. For example, the encapsulant 120 can permit brine to pass through the encapsulant 120 which will cause the swellable metal 110 to hydrolyze and transition to the expanded configuration 2000. Correspondingly, the swellable metal 110 can expand the encapsulant 120 and/or press the encapsulant 120 against at least one surface 22 of the fluid channel 2 and form a seal in the annulus 24 of the fluid channel 20. The swellable metal 110 can be sensitive to acid, as acid can prevent the swellable metal to form a solid after hydrolyzing. For example, acid can circulate in a wellbore during wellbore clean up. The encapsulant 120 can be operable to protect the swellable metal 110 from acid. In at least one example, the encapsulant 120 can at least partially separate the acid and the swellable metal 110. In other examples, the encapsulant 120 can contain a caustic that neutralizes the acid in the region proximate the swellable metal 110.

The swellable metal 110 with the encapsulant 120 can be used to make a seal, for example a packer on the outside of an oilfield tubular or a bridge plug on the inside of an oilfield tubular. In at least one example, the encapsulant 120 may rupture when the swellable metal 110 transitions to the expanded configuration 2000. As such, the swellable metal 110, after transitioning to the expanded configuration 2000, can interact directly with the surfaces 22, 23 of the fluid channel 20. In at least one example, the encapsulant 120 can be porous such that fluids or gases can pass through the encapsulant 120. For example, the encapsulant 120 can include at least one of a swellable rubber, neoprene, a polycarbonate material, polyurethane, and polytetrafluoroethylene. The encapsulant 120 can be porous having a plurality of holes in the encapsulant 120. In at least one example, the encapsulant 120 can be porous to gas migration. The encapsulant 120 can be a membrane filter such that only water migration is allowed.

In at least one example, the encapsulant 120 can enclose the swellable metal 110 by being wrapped around the swellable metal 110, molded around the swellable metal 110, deposited on the swellable metal such as chemical vapor deposition, or any other suitable method to enclose the swellable metal 110 at least partially by the encapsulant 120.

In at least one example, at least a portion of the encapsulant 120 is elastic and stretchable so that the swellable metal 110 can expand in a desired direction. For example, the encapsulant can be rigid in the axial direction but elastic in the radial direction. With such a configuration, the expansion of the swellable metal 110 can be guided in the radial direction while shear strength is provided in the axial direction.

The encapsulant 120 can enclose the swellable metal 110 is in particulate 112 form, such as illustrated in FIG. 3. The encapsulated swellable metal 110 can be conformable prior to transitioning to the expanded configuration 2000, similar to a bean bag. The form of the encapsulated swellable metal 110 can be locked into place upon transitioning to the expanded configuration 2000. As such, the particulate 112 of the swellable metal 110 in the encapsulant 120 can be used in a manner similar to a compression set packer.

The sealing apparatus 100, as illustrated in FIG. 1, is in an initial state 1000 such that the swellable metal 110 has not expanded in volume. As such, there is a gap in the annulus 24 of the fluid channel 20 between at least one surface of the sealing apparatus 100 and at least one surface 22 of the fluid channel 20. Fluid can flow through the gap in the annulus 24. The swellable metal 110, upon transitioning to the expanded configuration 2000 in the annulus 24 of the fluid channel 20, is operable to form a seal against a surface of the fluid channel such that fluid communication across the swellable metal 110 in the annulus 24 is substantially restricted. The sealing apparatus 100, when creating a seal against the surfaces 22 of the fluid channel 20, creates a sealing pressure. A sealing pressure is the pressure that the seal can withstand before the seal is broken, for example when the sealing apparatus 100 would begin to move within the fluid channel 20.

Figure 4:
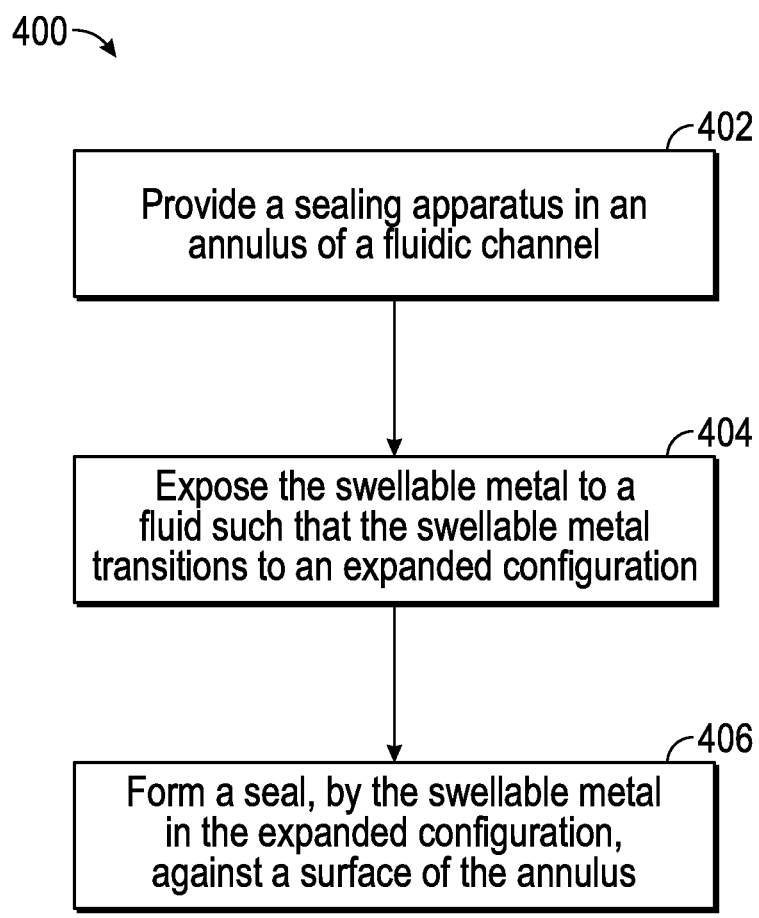
FIG. 4 is a flow chart of a method for utilizing a sealing apparatus.

Referring to FIG. 4, a flowchart is presented in accordance with an example embodiment. The method 400 is provided by way of example, as there are a variety of ways to carry out the method. The method 400 described below can be carried out using the configurations illustrated in FIG. 4, for example, and various elements of these figures are referenced in explaining example method 400. Each block shown in FIG. 4 represents one or more processes, methods or subroutines, carried out in the example method 400. Furthermore, the illustrated order of blocks is illustrative only and the order of the blocks can change according to the present disclosure. Additional blocks may be added or fewer blocks may be utilized, without departing from this disclosure. The example method 400 can begin at block 402.

At block 402, a sealing apparatus is provided in an annulus of a fluid channel. The sealing apparatus includes a swellable metal which may transition to an expanded configuration with an increased volume when exposed to a fluid and hydrolyzed. The sealing apparatus can also include an encapsulant. In other examples, the sealing apparatus does not include an encapsulant. The encapsulant encloses at least a portion of the swellable metal and is operable to permit fluid to flow through the encapsulant. For example, the encapsulant may have pores such that the fluid can flow through the pores to the swellable metal. The encapsulant can also protect the swellable metal from acid in the fluid channel. At least a portion of the encapsulant can be elastic so that the swellable metal expands in a desired direction. The swellable metal can be a solid ring of metal. In other examples, the swellable metal can be in particulate form. When in particulate form and enclosed by an encapsulant, the sealing apparatus can be conformable to a desired shape within the fluid channel.

At block 404, the swellable metal is exposed to a fluid, and the swellable metal may transition from an initial configuration to an expanded configuration with an increased volume. The fluid, when reacted with the swellable metal, hydrolyzes the swellable metal. The fluid can be, for example, brine. The water in the brine can react with the swellable metal such that the swellable metal hydrolyzes to a metal hydroxide and/or a metal oxide. When the swellable metal hydrolyzes to a metal hydroxide and/or a metal oxide, the volume of the reactants is greater than the initial material. As such, the volume of the swellable metal increases when in the expanded configuration.

At block 406, a seal is formed by the swellable metal in the expanded configuration against a surface of the annulus. The seal can be formed by the swellable metal directly against the surface of the annulus. In other examples, the seal can be formed by the encapsulant abutting the surface of the annulus. The seal formed by the sealing apparatus prevents fluid communication across the sealing apparatus within the annulus of the fluid channel. As such, the sealing apparatus isolates, from fluids, sections of the fluid channel. If the seal is not adequately preventing fluid communication across the sealing apparatus, is applicable, the swellable metal may be further dehydrated to further expand the swellable metal. In at least one example, the sealing apparatus can form a temporary seal such that the sealing apparatus can be removed at a desired time. In other examples, the sealing apparatus can form a permanent seal such that the seal is not removed.

EXAMPLES

To facilitate a better understanding of the present disclosure, the following examples of certain embodiments are given. In no way should the following examples be read to limit, or define, the scope of the disclosure.

Figure 5A:
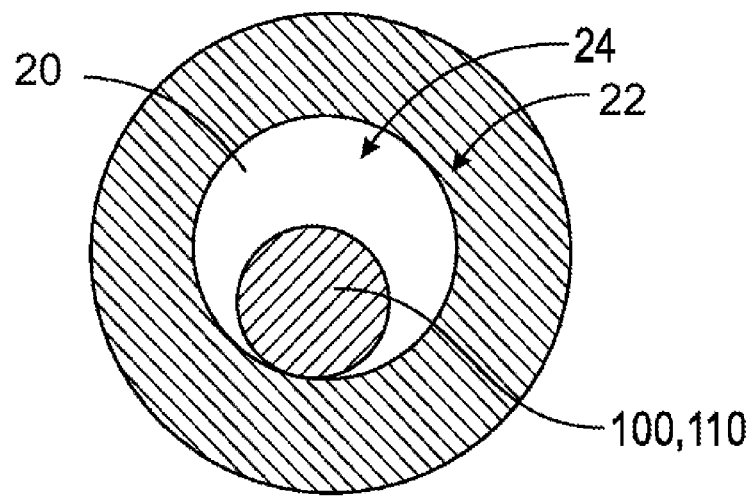
FIG. 5A is a schematic diagram of an example of a sealing apparatus in a fluid channel.
Figure 5B:
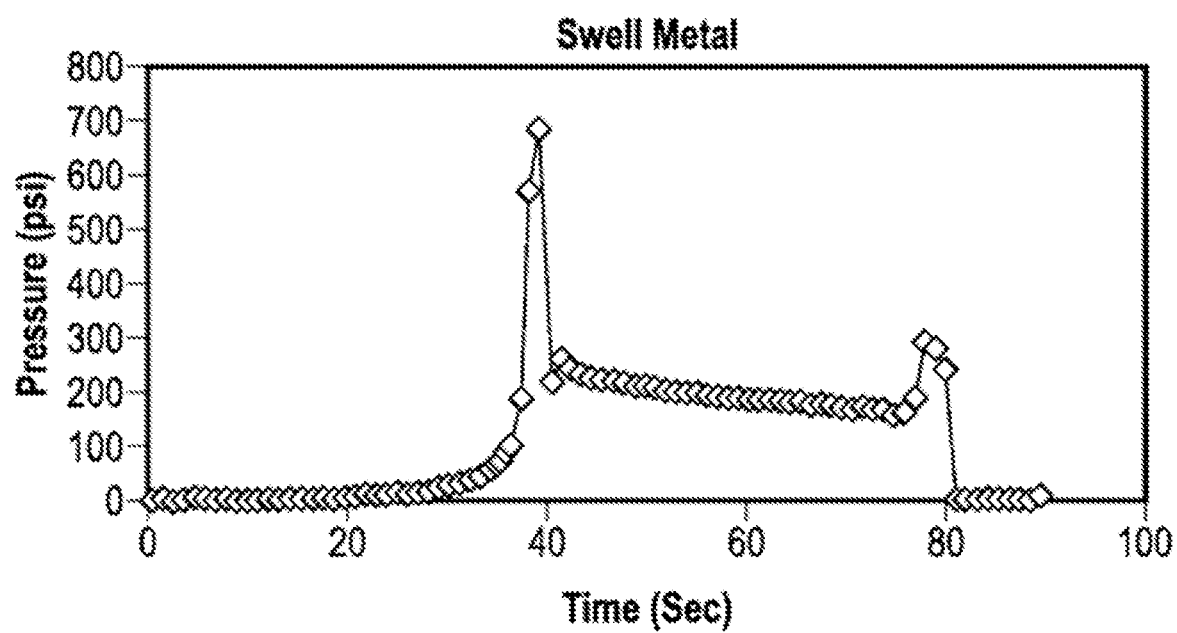
FIG. 5B is a graph of pressure versus time from the example of FIG. 5A.

An exemplary demonstration of a sealing apparatus 100 with a swellable metal 110 is illustrated in FIGS. 5A and 5B. Two 1 inch long rods of swellable metal 110 were placed in an annulus 24 of a tubing, or a fluid channel 20. The swellable metal rods 110 had a 0.5 inch diameter, and the internal diameter of the swellable rods 110 was 0.625 inches. The tubing was a steel nipple. In the exemplary demonstration, the sealing apparatus 100 did not include an encapsulant.

The swellable metal rods 110 were exposed to a 20% KCl solution at 200° F. The swellable metal rods 110 then transitioned to an expanded configuration and closed the annular gap in the fluidic channel 20, creating a seal. After the swellable metal rods 110 expanded, the sealing apparatus 100 held 300 psi without leaking for several minutes. Over 600 psi of pressure was applied in order to break the seal such that the swellable metal rods 110 began to shift in the fluidic channel 20. After the swellable metal rods 110 began to move, roughly 200 psi was sufficient to maintain that movement. Therefore, without any external support, the swellable metal 110 held 300 psi.

Numerous examples are provided herein to enhance understanding of the present disclosure. A specific set of statements are provided as follows.

Statement 1: A sealing apparatus is disclosed comprising: a swellable metal, the swellable metal, when exposed to a fluid, is transitionable from an initial configuration having an initial volume to an expanded configuration having an increased volume, wherein the swellable metal, upon transitioning to the expanded configuration in an annulus of a fluid channel, forms a seal against a surface of the fluid channel such that fluid communication across the swellable metal in the annulus is at least partially restricted.

Statement 2: A sealing apparatus is disclosed according to Statement 1, wherein the swellable metal includes at least one of an alkaline earth metal, a transition metal, and a post-transition metal.

Statement 3: A sealing apparatus is disclosed according to Statements 1 or 2, wherein, upon transitioning to the expanded configuration, the volume of the swellable metal increases by greater than 30% when uninhibited by the fluid channel.

Statement 4: A sealing apparatus is disclosed according to Statement 3, wherein the swellable metal includes at least one of magnesium, aluminum, and calcium.

Statement 5: A sealing apparatus is disclosed according to Statement 4, wherein the swellable metal includes a dopant that promotes corrosion, and wherein the dopant includes at least one of nickel, iron, copper, cobalt, carbon, tungsten, tin, gallium, and bismuth.

Statement 6: A sealing apparatus is disclosed according to any of preceding Statements 1-5, wherein the swellable metal is a solid piece of metal.

Statement 7: A sealing apparatus is disclosed according to any of preceding Statements 1-6, wherein the swellable metal is in particulate form.

Statement 8: A sealing apparatus is disclosed according to Statement 7, wherein the swellable metal is carried in a binder, wherein the binder comprises at least one of a degradable binder or a swellable elastomer.

Statement 9: A sealing apparatus is disclosed according to any of preceding Statements 1-8, further comprising an encapsulant enclosing at least a portion of the swellable metal.

Statement 10: A sealing apparatus is disclosed according to Statement 9, wherein the encapsulant is porous to permit the fluid to flow through the encapsulant, wherein the encapsulant protects the swellable metal from acid.

Statement 11: A sealing apparatus is disclosed according to Statements 9 or 10, wherein the encapsulant is configured to rupture when the swellable metal transitions to the expanded configuration.

Statement 12: A sealing apparatus is disclosed according to any of preceding Statements 9-11, wherein the encapsulant is porous, wherein the encapsulant includes at least one of a swellable rubber, neoprene, a polycarbonate material, or a polytetrafluoroethylene.

Statement 13: A sealing apparatus is disclosed according to any of preceding Statements 9-12, wherein the encapsulant encloses the swellable metal by at least one of being wrapped around the swellable metal, molded around the swellable metal, or deposited on the swellable metal.

Statement 14: A sealing apparatus is disclosed according to any of preceding Statements 9-13, wherein at least a portion of the encapsulant is elastic so that the swellable metal expands in a desired direction.

Statement 15: A method is disclosed comprising: providing a sealing apparatus as disclosed in any of preceding Statements 1-14 in an annulus of a fluid channel, the sealing apparatus including a swellable metal; exposing the swellable metal to a fluid such that the swellable metal transitions from an initial configuration having an initial volume to an expanded configuration having an increased volume; and forming a seal, by the swellable metal in the expanded configuration, against a surface of the fluid channel such that fluid communication across the swellable metal in the annulus is at least partially restricted.

Statement 16: A method is disclosed according to Statement 15, wherein the sealing apparatus further includes an encapsulant enclosing at least a portion of the swellable metal.

Statement 17: A method is disclosed according to Statements 15 or 16, wherein at least a portion of the encapsulant is elastic so that the swellable metal expands in a desired direction.

Statement 18: A system is disclosed comprising: a fluid channel with an annulus; and a sealing apparatus as disclosed in any of preceding Statements 1-14 including: a swellable metal, the swellable metal, when exposed to a fluid, is transitionable from an initial configuration having an initial volume to an expanded configuration having an increased volume, wherein the swellable metal, upon transitioning to the expanded configuration in an annulus, forms a seal against a surface of the fluid channel such that fluid communication across the swellable metal in the annulus is at least partially restricted.

Statement 19: A system is disclosed according to Statement 18, wherein the sealing apparatus further includes an encapsulant enclosing at least a portion of the swellable metal.

Statement 20: A system is disclosed according to Statements 18 or 19, wherein the encapsulant is porous to permit the fluid to flow through the encapsulant, wherein the encapsulant protects the swellable metal from acid.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A sealing apparatus comprising:
   a swellable metal, the swellable metal, when exposed to a fluid, is transitionable from an initial configuration having an initial volume to an expanded configuration having an increased volume, and an encapsulant enclosing at least a portion of the swellable metal;
   wherein the encapsulant is porous to permit the fluid to flow through the encapsulant,
   wherein the encapsulant at least partially separates the swellable metal from acid;
   wherein the swellable metal, upon transitioning to the expanded configuration in an annulus of a fluid channel, forms a seal against a surface of the fluid channel such that fluid communication across the swellable metal in the annulus is at least partially restricted.

2. The sealing apparatus of claim 1, wherein the swellable metal includes at least one of an alkaline earth metal, a transition metal, and a post-transition metal.

3. The sealing apparatus of claim 1, wherein, upon transitioning to the expanded configuration, the initial volume of the swellable metal increases by greater than 30% when uninhibited by the fluid channel.

4. The sealing apparatus of claim 3, wherein the swellable metal includes at least one of magnesium, aluminum, and calcium.

5. The sealing apparatus of claim 4, wherein the swellable metal includes a dopant that promotes corrosion, and wherein the dopant includes at least one of nickel, iron, copper, cobalt, carbon, tungsten, tin, gallium, and bismuth.

6. The sealing apparatus of claim 1, wherein the swellable metal is a solid piece of metal.

7. The sealing apparatus of claim 1, wherein the swellable metal is in particulate form.

8. The sealing apparatus of claim 7, wherein the swellable metal is carried in a binder, wherein the binder comprises at least one of a degradable binder or a swellable elastomer.

9. The sealing apparatus of claim 1, wherein the encapsulant is configured to rupture when the swellable metal transitions to the expanded configuration.

10. The sealing apparatus of claim 1, wherein the encapsulant is porous, wherein the encapsulant includes at least one of a swellable rubber, neoprene, a polycarbonate material, or a polytetrafluoroethylene.

11. The sealing apparatus of claim 1, wherein the encapsulant encloses the swellable metal by at least one of being wrapped around the swellable metal, molded around the swellable metal, or deposited on the swellable metal.

12. The sealing apparatus of claim 1, wherein at least a portion of the encapsulant is elastic so that the swellable metal expands in a desired direction.

13. A method comprising:
   providing a sealing apparatus in an annulus of a fluid channel, the sealing apparatus including a swellable metal and an encapsulant enclosing at least a portion of the swellable metal;
   exposing the swellable metal to a fluid such that the swellable metal transitions from an initial configuration having an initial volume to an expanded configuration having an increased volume; and
   forming a seal, by the swellable metal in the expanded configuration, against a surface of the fluid channel such that fluid communication across the swellable metal in the annulus is at least partially restricted;
   wherein the encapsulant is porous to permit the fluid to flow through the encapsulant,
   wherein the encapsulant at least partially separates the swellable metal from acid.

14. The method of claim 13, wherein at least a portion of the encapsulant is elastic so that the swellable metal expands in a desired direction.

15. A system comprising:
   a fluid channel with an annulus; and
   a sealing apparatus including:
      a swellable metal, the swellable metal, when exposed to a fluid, is transitionable from an initial configuration having an initial volume to an expanded configuration having an increased volume, and an encapsulant enclosing at least a portion of the swellable metal
      wherein the encapsulant is porous to permit the fluid to flow through the encapsulant,
      wherein the encapsulant at least partially separates the swellable metal from acid;
      wherein the swellable metal, upon transitioning to the expanded configuration in the annulus, forms a seal against a surface of the fluid channel such that fluid communication across the swellable metal in the annulus is at least partially restricted.

* * * * *